US009789816B2

(12) United States Patent
Heger et al.

(10) Patent No.: US 9,789,816 B2
(45) Date of Patent: Oct. 17, 2017

(54) METHOD AND SYSTEM FOR DETERMINING AN EGO-MOTION OF A VEHICLE

(75) Inventors: Thomas Heger, Glemsstrasse (DE); Stephan Simon, Sibbesse (DE); Michael Helmle, Esslingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 760 days.

(21) Appl. No.: 13/994,893

(22) PCT Filed: Dec. 6, 2011

(86) PCT No.: PCT/EP2011/071961
§ 371 (c)(1),
(2), (4) Date: Sep. 5, 2013

(87) PCT Pub. No.: WO2012/080044
PCT Pub. Date: Jun. 21, 2012

(65) Prior Publication Data
US 2013/0335553 A1    Dec. 19, 2013

(30) Foreign Application Priority Data
Dec. 15, 2010    (DE) .................. 10 2010 063 133

(51) Int. Cl.
*B60Q 9/00*    (2006.01)
*B62D 15/02*   (2006.01)

(52) U.S. Cl.
CPC ............. *B60Q 9/005* (2013.01); *B60Q 9/008* (2013.01); *B62D 15/0285* (2013.01)

(58) Field of Classification Search
CPC .... B60Q 9/005; B60Q 9/008; B62D 15/0285; G06T 2207/30252; G06K 9/00; H04N 13/0239

(Continued)

(56) References Cited

U.S. PATENT DOCUMENTS 6,704,621 B1 *    3/2004    Stein ................. G01S 11/12
                                                    382/104
7,113,867 B1 *    9/2006    Stein ................ G06K 9/00805
                                                    701/301

(Continued)

FOREIGN PATENT DOCUMENTS

CN    101048673    10/2007
CN    101270983    9/2008

(Continued)

OTHER PUBLICATIONS

Giachetti A et al: "The Recovery of Optical Flow for Intelligent Cruise Control",Oct. 24, 1994; Oct. 24, 1994-Oct. 26, 1994, Oct. 24, 1994 (Oct. 24, 1994), pp. 91-96, XP010258311.

(Continued)

*Primary Examiner* — Behrooz Senfi
(74) *Attorney, Agent, or Firm* — Norton Rose Fulbright US LLP; Gerard Messina

(57) ABSTRACT

A method for determining an ego-motion of a vehicle is described, which is carried out in driver assistance systems, particularly in parking assistance systems. The method involves: taking a sequence of images, successive in time of a vehicle surroundings by a vehicle camera; determining, based on the image sequence, at least one motion flow with regard to an object in the vehicle surroundings; and determining the ego-motion of the vehicle based on the at least one motion flow.

7 Claims, 3 Drawing Sheets

(58) Field of Classification Search
USPC .......................................................... 348/118
See application file for complete search history.

(56) References Cited

U.S. PATENT DOCUMENTS

| | | | | |
|---|---|---|---|---|
| 7,437,244 | B2* | 10/2008 | Okada | G08G 1/166 |
| | | | | 348/155 |
| 7,899,211 | B2* | 3/2011 | Fujimoto | G06T 7/0083 |
| | | | | 340/436 |
| 8,559,674 | B2* | 10/2013 | Uchida | B60R 1/00 |
| | | | | 382/106 |
| 8,861,792 | B2* | 10/2014 | Stein | G08G 1/16 |
| | | | | 382/104 |
| 9,233,659 | B2* | 1/2016 | Rosenbaum | B60W 30/0956 |
| 2007/0147660 | A1* | 6/2007 | Durucan | B60K 35/00 |
| | | | | 382/104 |
| 2007/0154068 | A1* | 7/2007 | Stein | G01C 3/22 |
| | | | | 382/106 |
| 2009/0143986 | A1 | 6/2009 | Stein et al. | |
| 2009/0182690 | A1* | 7/2009 | Stein | G01J 1/04 |
| | | | | 706/12 |
| 2009/0243889 | A1 | 10/2009 | Suhr et al. | |
| 2009/0326774 | A1 | 12/2009 | Wang | |
| 2010/0045449 | A1 | 2/2010 | Stein | |
| 2010/0305857 | A1* | 12/2010 | Byrne | G06T 7/0042 |
| | | | | 701/301 |
| 2011/0115615 | A1* | 5/2011 | Luo | B60R 1/00 |
| | | | | 340/436 |
| 2012/0105639 | A1* | 5/2012 | Stein | H04N 5/235 |
| | | | | 348/148 |

FOREIGN PATENT DOCUMENTS

| | | |
|---|---|---|
| CN | 101327796 A | 12/2008 |
| DE | 102005000651 | 7/2006 |
| DE | 102006027123 | 12/2007 |
| DE | 602004012962 | 7/2008 |
| DE | 10 2007 022 524 | 11/2008 |
| DE | 102008036009 | 10/2009 |
| DE | 10 2008 058 279 | 5/2010 |
| JP | 2005216255 | 8/2005 |
| JP | 2007-176324 | 7/2007 |
| JP | 2010008280 | 1/2010 |

OTHER PUBLICATIONS

Elisa Martinez et al: "Driving Assistance System Based on the Detection of Head-on Collisions", Intelligent Vehicles Symosium, 2008 IEEE, IEEE, Piscataway, NJ, USA, Jun. 4, 2008 (Jun. 4, 2008), pp. 913-918, XP031318920.

\* cited by examiner

METHOD AND SYSTEM FOR DETERMINING AN EGO-MOTION OF A VEHICLE

FIELD OF THE INVENTION

The present invention relates to a method for determining an ego-motion (self-movement) of a vehicle, which is carried out in driver assistance systems, particularly in parking assistance systems.

BACKGROUND INFORMATION

Driver assistance systems are used to assist the driver in certain driving situations. A driver assistance system may include, for example, an ABS (antilock system), ESP (electronic stability program), a distance-regulating cruise controller ("adaptive cruise control", ACC), and/or a parking assistant for assisting parking or unparking (leaving a parking space). For at least some of the driver assistance subsystems, determining a vehicle ego-motion is also required. This is so, for instance, in a system for collision-warning, which is based on a prediction as to whether, in response to the continuation of the instantaneous vehicle motion, a collision will occur or not. Parking assistants require data for the instantaneous actual vehicle position with regard to objects bordering on a parking space, for example, for the calculation, monitoring and possibly an adjustment of a trajectory. Parking garage assistants, which include, as a rule, both a collision warning and a trajectory computation, therefore also need information on ego-motion from which an instantaneous position of the vehicle may also be computed.

It is generally known that one may determine a vehicle's ego-motion (self-movement) based on sensors which measure a vehicle state independent of the surroundings. For example, bicycle system sensors, engine system sensors or braking system sensors supply data on vehicle speed, steering sensors supply data on an instantaneous steering angle. In addition, it is also known that one may raise an instantaneous vehicle position based on GPS ("global positioning system"). Data on cornering of the vehicle may be raised possibly based on a gyroscope.

In German Published Patent Application No. 10 2008 036 009, a method is described for protecting a vehicle from a collision in a parking and maneuvering area. For this purpose, ultrasonic sensors record data on the surroundings of the vehicle. From additional data on vehicle speed and the instantaneous steering angle, the ultrasonic sensor data measured in a coordinate system oriented relative to the vehicle are transformed into a coordinate system oriented relative to space, which yields a surroundings map oriented relative to space. From the surroundings map and the ego-motion of the vehicle, a collision probability is calculated of the vehicle with objects located in the surroundings of the vehicle.

From German Patent No. 60 2004 012 962, a method is known for real-time obstacle detection from a vehicle moving relative to a road. Based on images of a video camera, the motion flows of points are calculated whose projected motion is recorded by the camera. Points which belong to potential obstacles, which do not move in common with the plane of the road, are determined via an optical flow method. This camera-based obstacle detection method is able to be combined with additional systems, such as an ultrasonic obstacle detection system, in order to arrive at a greater accuracy and/or a more robust method.

The methods for collision protection and obstacle detection described above are either not very accurate or they are complex. However, if the complexity of a parking assistant, for example, is to remain limited for reasons of cost, this can only be achieved in that, for example, in the calculation of a parking trajectory or for collision warning, comparatively large safety distances are provided. This, however, limits the utility of corresponding systems during assisted parking or during navigation in an unclear surroundings such as a parking garage.

SUMMARY

According to the present invention, a method is provided for determining an ego-motion (self-movement) of a vehicle, which includes the following steps: Taking a sequence of images successive in time of a vehicle surroundings by a vehicle camera; determining at least one motion flow with regard to an object in the vehicle surroundings; and determining the ego-motion of the vehicle based on the at least one motion flow.

The vehicle camera may be a rearview camera, for example, which takes images in a rear vehicle surroundings, such as in backward travel during parking or unparking.

The object, whose motion flow is being determined, may be a static object in the vehicle surroundings, such as another vehicle, a parking space limitation, etc. To determine a motion flow, finally, a surface of a structure is required, and consequently the object may also be a surface of a road or roadway, a parking space or another body surface that lies within the field of vision of the camera, to the extent that a motion flow is measurable in this case.

For determining the ego-motion of the vehicle, furthermore, data may be drawn upon from vehicle sensors which measure an instantaneous speed and/or an instantaneous steering angle. In addition or as an alternative, for the determination of the ego-motion of the vehicle, data may be drawn upon from ultrasonic sensors which measure the distance from objects in the vehicle surroundings. Additional data on the instantaneous position or motion of the vehicle may be drawn upon by GPS systems, gyroscopes or other position-sensitive or motion-sensitive detectors.

In certain specific embodiments of the method according to the present invention, from the at least one determined motion flow (which may relate to a motion of the vehicle relative to an obstacle, for instance, to a parking space-bordering object) a "time to collision" ("time to contact", "time to crash" TTC) is calculated, which goes into the determination of the ego-motion. In connection with an optical flow calculation, a TTC may be more direct and simpler to calculate than a motion of position of a vehicle, so that the determination of the ego-motion of the vehicle may also become simplified. In addition or alternatively, the TTC may also be used for a determination of a collision warning.

Moreover, specific embodiments of the method according to the present invention may include that, based on at least one determined motion flow, and at least one additional determined motion flow and/or additional sensor data, such as ultrasound data, wheel state data and steering data, an ego-motion of an object in the vehicle surroundings is detected. This makes possible the detection of non-static objects, such as pedestrians crossing a parking space, moving vehicles bordering parking spaces, etc. Because of this, the reliability of collision warning systems may be appropriately improved.

Furthermore, according to the present invention, a method is provide in a parking assistance system of a vehicle, which is used for the continuous calculation, checking and/or adjustment of a parking trajectory. In this case, an ego-motion of the vehicle is determined in the manner sketched above.

Still further, a method is provided for collision warning in a driver assistance system of a vehicle, in which an ego-motion of a vehicle is determined as was sketched above.

Furthermore, in accordance with the present invention, a computer program is provided, according to which one of the methods described here is implemented when the computer program is run on a programmable computer device. The computer device may be a module, for instance, for implementing a driver assistance system, or a subsystem thereof, in a vehicle. The computer program is able to be stored on a machine-readable storage medium, such as a permanent or rewritable storage medium or in an assignment to a computer device or on a removable CD-ROM, DVD or a USB stick. In addition or as an alternative, the computer program may be provided on a computer device, such as a server, for downloading, e.g., via a data network such as the Internet, or via a communication link such as a telephone line or a wireless connection.

Furthermore, in accordance with the present invention, a driver assistance system is provided, which is developed for determining an ego-motion of a vehicle. This system includes the following components: A vehicle camera for taking a sequence of images successive in time of a vehicle surroundings; a component for determining, based on the image sequence, at least one motion flow with regard to an object in the vehicle surroundings; and a component for determining the ego-motion of the vehicle based on the at least one optical flow.

Among other things, the present invention is based on the idea of improving the calculation of the ego-motion of a vehicle in a simple manner, by drawing upon data of a vehicle camera for the determination of the ego-motion, for instance, the data of a rearview camera. In the systems known up to now, images of a vehicle camera are used only for obstacle detection, and not for determining the vehicle's ego-motion; the latter is rather determined based on sensors independent of the surroundings, such as wheel state sensors and steering angle sensors, or via GPS, gyroscope and the like.

The present invention leads to an increase in the accuracy of parking assistants, collision warning systems, etc., without increasing their complexity excessively. An improved accuracy in the determination of an ego-motion is helpful, for example, in the calculation, monitoring and adjustment of a parking/unparking trajectory, so as to achieve "gentle" parking in response to automatic guidance, for a collision warning, etc. These advantages are achieved, in part, in that, based on the improved accuracy in the determination of the ego-motion, lower safety distances from objects or potential obstacles along a travel route envelope or a trajectory during parking and unparking, navigating in a cramped surroundings such as a parking garage, etc., are required.

The more accurate determination of the vehicle's ego-motion makes possible an improved guidance of the vehicle along a precalculated trajectory during parking, for example. Thus, for example, yawing of the vehicle in the lateral direction may be detected earlier and better, and countersteering may be prompted.

The present invention also offers the possibility, additionally or alternatively to improve methods for distance estimation from objects in the vehicle's surroundings, which may be based on an ultrasound system, for example. The combination with the determining of motion flows (optical flows) in a camera image sequence enables more accurate and more robust distance estimates. This applies, for example, to the simultaneous use of a rearview camera and an ultrasonic sensor system for a parking assistant. The present invention may also be used for a determination of relative speed, perhaps within the scope of a precrash application. In this case, by the combination of the vehicle separation distance speed data and/or relative speed data determined from ultrasound data and video data, a threatening collision may be predicted more reliably and more accurately.

In the case of a vehicle camera that is already present, no additional hardware components are required to implement the invention. If motion flows and/or optical flow calculation methods in an existing implementation are used already for obstacle detection, corresponding calculation modules for an ego-motion calculation may be used again, which lowers the implementation costs.

DETAILED DESCRIPTION

Figure 1:
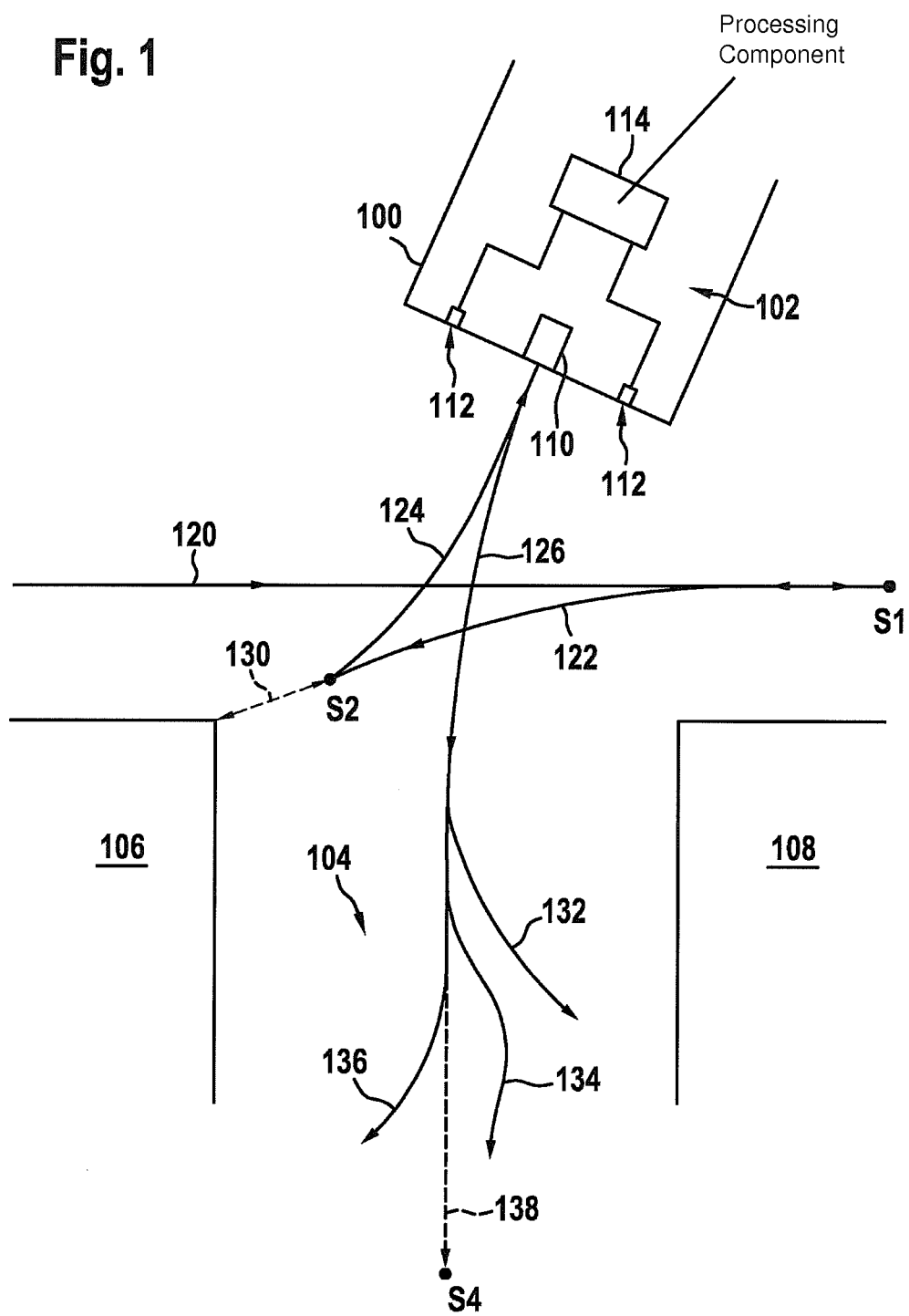
FIG. 1 shows a vehicle equipped with a driver assistance system according to the present invention, in an exemplary parking situation.

FIG. 1 illustrates in schematic form a vehicle 100 equipped, according to the present invention, with a driver assistance system 102 in an exemplary parking situation, in which the vehicle 100 is to be parked backwards in a parking space 104 between parking space-limiting objects 106 and 108, which may be parking vehicles, for example. Driver assistance system 102 has a camera 110 implemented as a rearview camera, as well as a set of ultrasonic sensors 112. All the sensors 110, 112 are connected via a vehicle network (not shown) to a central processing component 114, which is implemented as an ECU ("electronic control unit").

Vehicle 100 first moves along path 120, past parking space 104, the latter being measured by additional sensors (not shown) of driver assistance system 102. The driver decides to park, whereupon the vehicle stops at stopping point S1. From this point on, a parking assistant (a subsystem of driver assistance system 102) takes over the further parking in a partially or fully automatic manner. Vehicle 100 is guided backwards up to stopping point S2 along trajectory 122 calculated by the parking assistant, then is pulled forward along a calculated trajectory 124 up to an additional stopping point (not designated) and is then guided into parking space 104, backwards via trajectory 126.

Inaccuracies in recording the measurements of obstacles, the determination of the ego-motion (self-movement) as well as the instantaneous position of a vehicle, in a usual parking assistant, require a comparatively large tolerance, that is, in the calculation of trajectories like the ones sketched in FIG. 1, large safety distances from obstacles such as objects 106, 108 are maintained, in order safely to avoid dangerous approaches.

As an example, in FIG. 1 a safety distance 130 between stopping point S2 and object 106 is drawn in, which in the case of usual systems is of the order of magnitude of 10 cm or more, 20 cm, for example, although a smaller safety distance of less than 10 cm, such as 5 cm, or even only 1-2 cm would be desirable, in order perhaps to be able to use tight parking spaces, and to be able to park in a parking space in spite of cramped maneuvering space.

Inaccuracies in the determination of ego-motion and/or the instantaneous position of a vehicle also lead to the fact that, in the guidance of a vehicle along precalculated trajectories, deviations will occur. In the corrections which may then be required, the inaccuracies mentioned are in turn taken into account. As an example, in FIG. 1, for trajectory 126, the ideal course of the actual vehicle motion is indicated as a dashed line 138 up to reaching final stopping point S4. Reference numerals 132, 134 and 136 show examples of various real motion sequences, which deviate more or less greatly from ideal trajectory 126/138. In the case of trajectories 132 and 136, countersteering has to take place in time to avoid a collision with objects 106 and 108, respectively. For reasons of clarity, only trajectory 126 is discussed here, but these statements analogously apply in the same way for trajectories 122 and 124.

The inaccuracies in the determination of the ego-motion and the instantaneous position of the vehicle are advantageously minimized, in order early to bring under control curves along trajectories like the ones indicated by arrows 132 and 136. In the exemplary specific embodiment of the present invention described here, an exact determination of the ego-motion is achieved in that data of rearview camera 110 that is present are combined with additional data of the present ultrasonic sensors 112 and data of additional sensors (also already present for other reasons), for measuring the motion of vehicle 110. In this way, without using additional hardware components, increased accuracy is able to be achieved in checking and adjusting the actual vehicle motion to trajectory 126/138, the maximum deviations being so low as is indicated, for example, by trajectory 134.

Figure 2:
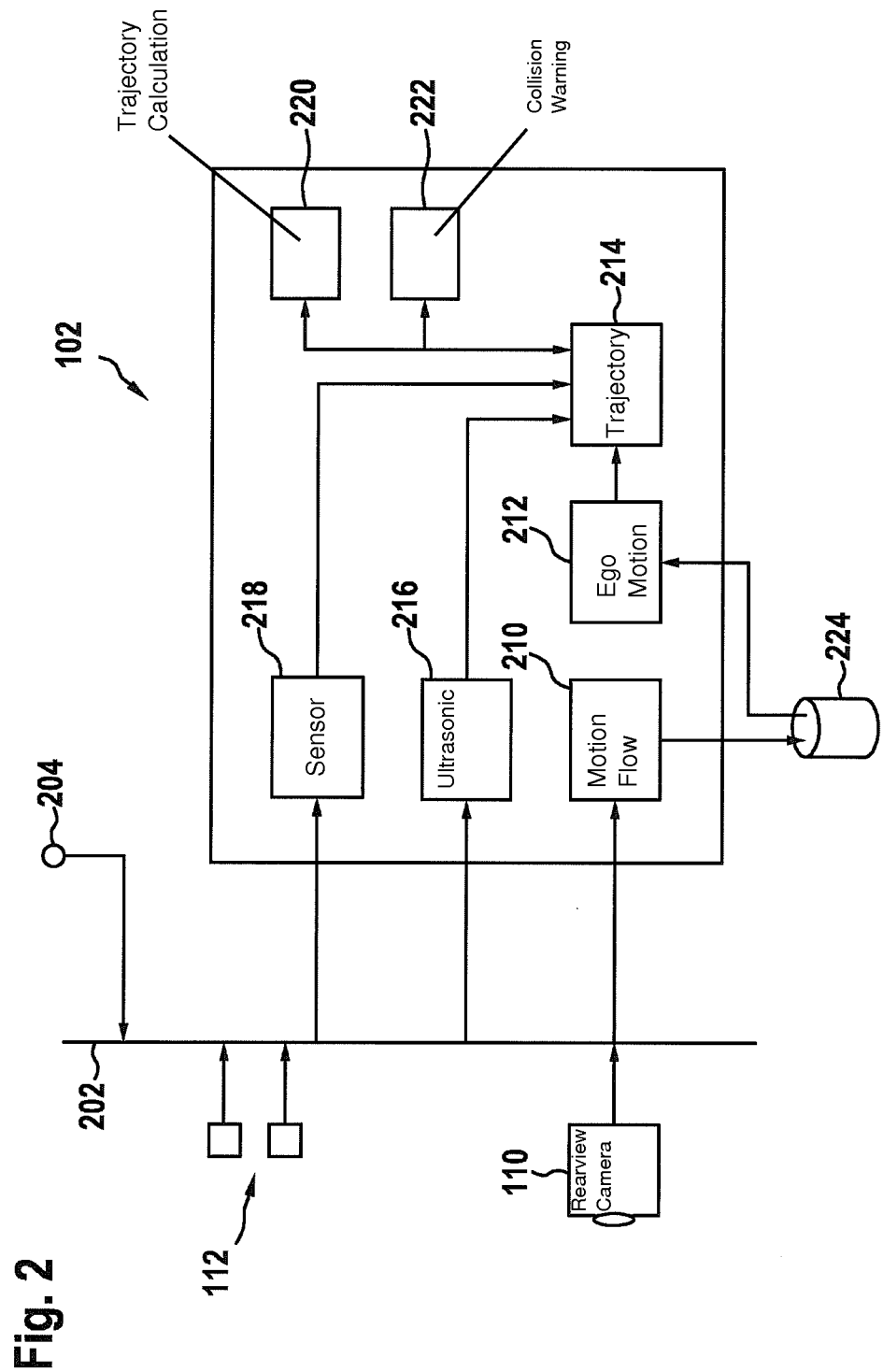
FIG. 2 shows a schematic representation of functional components of the driver assistance system of FIG. 1.

FIG. 2 schematically illustrates functional components of driver assistance system 102, whose collaboration makes possible an improved determination of the ego-motion of vehicle 100, according to the present invention. Rearview cameras 110, ultrasonic sensors 112 and ECU 114 are connected to a vehicle network 202 implemented as a bus system (these elements have already been shown in FIG. 1). Furthermore, at least one sensor system 204 is connected to bus 202, sensor system 202 being able to include the following, for example: A radar sensor or a plurality of such sensors for the determination, independent of the surroundings, of a vehicle speed; a steering sensor for determining a steering angle, a gyroscope for determining a rotational motion of the vehicle, a GPS sensor, etc.

ECU 114 includes a motion flow component 210 for determining motion flows in image sequences, an ego-motion component 212 for determining an ego-motion of vehicle 100 based on motion flows determined in component 210, a trajectory component 214 for calculating, checking and/or adjusting trajectories such as the trajectories 122-126 shown in FIG. 1, an ultrasonic component 216 for calculating distances of and directions towards objects which are detected by the ultrasonic sensor system 112, as well as a sensor component 218 for processing data of sensor system 204.

A manner of operating the components of driver assistance system 102 shown in FIG. 2 will be explained in greater detail below, with reference to flow chart 300, in FIG. 3. As was mentioned before, the components shown in FIG. 2 work together to determine (302) an ego-motion of vehicle 100 during parking in a parking space. In step 304, rearview camera 110 takes a sequence of images, successive in time, of the rear surroundings of vehicle 100.

In practice, rearview camera 110 will be active during the entire parking process along trajectories 122-126 and will supply to ECU 114 a continuous stream of images. Component 210 of ECU 114 actuates rearview camera 110 in a corresponding way, and stores the image sequence supplied by camera 110 in temporary storage 224 for further processing.

In parallel to this, ultrasonic sensors 112 also measure a rear vehicle surroundings range, and correspondingly supply data via bus 202 to assigned processing component 216. In addition, sensor system 204 also continually supplies instantaneous data on speed and steering angle of vehicle 100, for example, to assigned processing component 208.

In step 306, processing component 212 determines from an image sequence, which includes a plurality of takes that are successive in time, which are stored in memory area 224, a "motion flow" of at least one object that is identified in the rear vehicle surroundings. For this purpose, memory area 224 may be designed as a cyclical memory, for example, in which a certain number of takes of rearview camera 110 are temporarily stored for a back period of time and are correspondingly overwritten by new takes. The determination of a motion flow of points which identify an object, from an image sequence, for instance, based on optical flow methods, is known per se to one skilled in the art, and will therefore not be further discussed.

In the exemplary scenario of FIG. 1, particularly objects 106 and 108 are located in the field of view of camera 110. Consequently, processing component 212 would identify objects 106 and 108 from the stored images, and would in each case determine their motion flow. Because rearview camera 110 is fixedly fastened on vehicle 100 (or at least in a known instantaneous position and alignment), component 212 calculates the motion flows of objects 106 and 108 in a coordinate system oriented to the vehicle.

In addition to the processing of the optical or infrared data supplied by camera 110 in ECU component 212, ECU 114, using its component 216, processes representations of the rear vehicle surroundings supplied by ultrasound sensor system 112. From the data, one could determine instantaneous distances from, and alignments towards objects 106, 108, for example. These data also refer to a coordinate system oriented to the vehicle, that is, based on the ultrasonic data, independent values for a motion of objects 106 and 108 could be determined in a coordinate system oriented to the vehicle. Sensor system 204 is not sensitive to the surroundings of vehicle 100; component 218 processes corresponding sensor data and provides data independent of the surroundings to an instantaneous vehicle motion.

In step 308, calculating component 214 receives the processing data of components 212, 216 and 218, i.e. specifically camera-based data on the apparent motion of objects 106 and 108 with reference to vehicle 100 from component 212, corresponding ultrasound-based data from component 216 and data on the ego-motion of vehicle 100 with the aid of, for instance, wheel speed and steering angle from component 218. With the aid of the data, component 214 ascertains an estimate for the "ego-motion" of vehicle 100. Component 214 is able to carry out a data fusion, for example, during which an ego-motion of vehicle 100 ascertained by sensor system 204 independent of the surroundings is corrected, based on the motion flows of objects 106, 108 ascertained from the camera data.

For example, the ego-motion ascertained may be corrected with regard to a lateral motion of objects 106 or 108, which is able to be measured very accurately, based on the camera data after processing by an optical flow method. Consequently, for instance, slight yawing of the vehicle is able to be detected early as a deviation around a previously calculated trajectory (cf. the corresponding exemplary discussion below).

In addition to the sensor data of sensor system 204 and the camera data of camera 110, the ultrasonic data of ultrasonic sensor system 112 may also be drawn upon for the correction and the more accurate determination of the ego-motion of vehicle 100. For example, distances from, and directions to objects 106, 108 may be determined, in each case, both from the ultrasonic data and the camera data, and then brought together in a suitable manner. From the curves of the distance values and/or the direction values, one may then make a correction based on the sensors independent of the surroundings and/or the ego-motion ascertained by the camera, on the assumption of surrounding objects being at rest, for example.

In addition or as an alternative, an ego-motion of vehicle 100 may also take place based on the determination of a motion flow of the roadway surface and perhaps the ground surface of the parking bay 104. If a ground surface is taken as the basis for a motion flow calculation, one may assume, in particular, that it is static, i.e. that an ego-motion of vehicle 100 may be reliably determined Based on the estimates on the ego-motion of vehicle 100, based perhaps on the data of camera 110, and also, independently thereof, sensor system 204, a motion of an object 106 or 108 may also be determined as a further possibility. This would come about, for instance, from a systematic discrepancy between the expected position and the expected distance of the object, as is yielded from the ego-motion of vehicle 100 based on sensor system 204, as compared to the camera-based ascertained motion flow of this object.

Calculation component 214 may operate quasi-continuously and may, for instance, at regular intervals of 100 milliseconds, draw upon the processing data of components 210, 216 and 218 with regard to a past time period of 0.1, 0.3, 0.5 or 1.0 seconds (particularly the ego-motion ascertained based on the takes of camera 110 stored temporarily for a corresponding time period).

In step 310, calculating component 214 supplies the calculated value of the (instantaneous) ego-motion of vehicle 100 to one or more additional components of driver assistance system 102. Drawn as examples in FIG. 2 are trajectory calculation component 220 and collision warning component 222. Component 220 monitors, among other things, for example, with the aid of the provided ego-motion, to what extent vehicle 100 is actually following the precalculated trajectory 122-126 during parking in parking space 104. Based on the ego-motion of vehicle 100 ascertained on the basis of the camera, component 220 is able to establish, for example, whether countersteering is required.

If the calculated parking trajectory is the ideal 138 shown as a dashed line in FIG. 1, for example, parking vehicle 100 along this trajectory would mean a certain apparent motion of objects 106 and 108 in the field of vision of rearview camera 110. In particular, objects 106 and 108 would move laterally in a certain way from out of the field of vision of the camera, and upon approaching stopping point S4, the distance of each of objects 106, 108 would remain constant. If the vehicle actually moves, based on an inaccuracy in the steering (yawing), perhaps on trajectory 132, object 108 would not move in the expected manner from out of the field of vision of rearview camera 110 and/or the distance from object 108, as calculated from an optical flow calculation in component 212, would decrease, while at the same time object 106 is gradually moving out of the field of vision of rearview camera 110 and the distance is increasing. From this explanation it becomes clear that a comparison of the precalculated trajectory to the actual trajectory is able to be improved by taking into account the motion flows ascertained, based on the camera, of objects 106, 108.

In order to get from the ascertained or the actual trajectory 132 back into the vicinity of the ideal trajectory 138, component 220 initiates appropriate countersteering. Consequently, on an overall basis, only a slight deviation occurs from the ideal, precalculated trajectory 138.

For the ascertained or actual trajectory 132, component 222 also, based on the improved ego-motion estimation and the distances from potential obstacles 106, 108 (for instance, ascertained based on the camera or on ultrasound), calculates the probability of a collision and, if necessary, generates corresponding collision warnings, which are either output to the driver or may lead to automatic braking.

Figure 3:
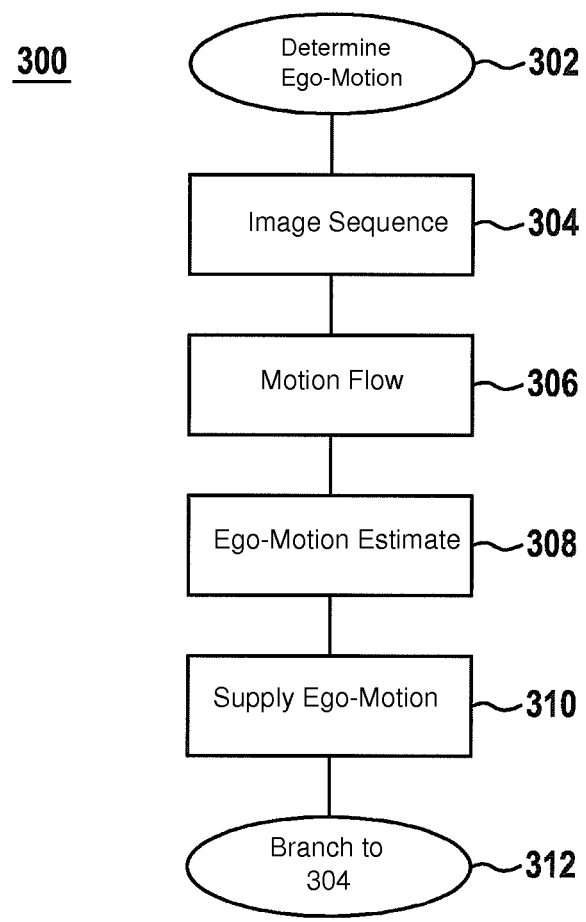
FIG. 3 shows a manner of operating the driver assistance system of FIG. 2 in the form of a flow chart.

Sequence 300, shown in FIG. 3, is run through cyclically during parking in parking space 104, so that step 312 branches back to step 304.

Whereas, in the exemplary embodiment shown here, ultrasonic data, camera data and sensor data independent of the surroundings are evaluated, in simple systems, a vehicle ego-motion, also exclusively camera-based, may take place, or may take place, without taking into account ultrasonic data, only camera-based and based on data that are independent of the surroundings. Whereas in the example described above, a vehicle motion and a vehicle position were determined based independently of the surroundings on vehicle speed and steering angle, an additional or another sensor system may also supply data that are independent of the surroundings; as an example, a GPS sensor and/or a gyroscope may be used.

As was described above, a camera-based and/or an ultrasound-based surroundings map, based on a coordinate system oriented to the vehicle, is able to be transformed into a surroundings map based on a coordinate system oriented in space, in which the ego-motion of the vehicle may be shown. It is also conceivable, vice versa, to leave the vehicle-oriented surroundings map and to take into account accordingly the data of the sensor system independent of the surroundings.

Collision times TTC's may be derived comparatively simply from the determination of motion flows, for example, within the scope of an optical flow calculation. These TTC's may be output directly from the processing of the camera data (or after the correction of a vehicle-oriented/space-oriented surroundings map and the ego-motion of the vehicle by the additional data of an ultrasonic sensor system or further sensor data) to a collision warning system.

The present invention is not limited to the exemplary embodiments described above and the aspects emphasized therein; rather, a plurality of modifications are possible, that are within the scope of action of one skilled in the art, within the field of the present invention.

What is claimed is:

1. A method for determining an ego-motion of a vehicle, the method comprising:
   taking, by a vehicle camera, a sequence of images, successive in time, of vehicle surroundings;
   determining, based on the image sequence, at least one motion flow with respect to an object in the vehicle surroundings;
   determining the ego-motion of the vehicle based on the at least one motion flow; and calculating a time-to-collision from the at least one motion flow, the time-to-collision being factored into the determining of the ego-motion;

wherein the determining of the ego-motion of the vehicle includes drawing data from at least one vehicle sensor that measures at least one of an instantaneous speed and an instantaneous steering angle, and wherein the determining of the ego-motion of the vehicle includes drawing data from at least one ultrasonic sensor of the vehicle that measures a distance from the object in the vehicle surroundings, and wherein the ego-motion includes prompting counter-steering of the vehicle.

2. The method as recited in claim 1, wherein the vehicle camera is a rearview camera that takes images of the vehicle surroundings from a rear perspective.

3. The method as recited in claim 1, further comprising: detecting the ego-motion of the object in the vehicle surroundings based on the at least one determined motion flow and at least one of at least one additional determined motion flow and additional sensor data.

4. A method in a parking assistance system of a vehicle for at least one of a continuous calculation, checking, and adjustment of a parking trajectory, comprising:
determining an ego-motion of the vehicle by:
taking, by a vehicle camera, a sequence of images, successive in time, of vehicle surroundings;
determining, based on the image sequence, at least one motion flow with respect to an object in the vehicle surroundings;
determining the ego-motion of the vehicle based on the at least one motion flow; and
calculating a time-to-collision from the at least one motion flow, the time-to-collision being factored into the determining of the ego-motion;
wherein the determining of the ego-motion of the vehicle includes drawing data from at least one vehicle sensor that measures at least one of an instantaneous speed and an instantaneous steering angle, and
wherein the determining of the ego-motion of the vehicle includes drawing data from at least one ultrasonic sensor of the vehicle that measures a distance from the object in the vehicle surroundings, and
wherein the ego-motion includes prompting counter-steering of the vehicle.

5. A method for collision warning in a driver assistance system of a vehicle, comprising:
determining an ego-motion of the vehicle:
taking, by a vehicle camera, a sequence of images, successive in time, of vehicle surroundings;
determining, based on the image sequence, at least one motion flow with respect to an object in the vehicle surroundings; and
determining the ego-motion of the vehicle based on the at least one motion flow; and
calculating a time-to-collision from the at least one motion flow, the time-to-collision being factored into the determining of the ego-motion;
wherein the determining of the ego-motion of the vehicle includes drawing data from at least one vehicle sensor that measures at least one of an instantaneous speed and an instantaneous steering angle, and
wherein the determining of the ego-motion of the vehicle includes drawing data from at least one ultrasonic sensor of the vehicle that measures a distance from the object in the vehicle surroundings, and
wherein the ego-motion includes prompting counter-steering of the vehicle.

6. A non-transitory computer readable medium having a computer program, which is executable by a processor, comprising:
a program code arrangement having program code for determining an ego-motion of a vehicle, by performing the following:
taking, by a vehicle camera, a sequence of images, successive in time, of vehicle surroundings;
determining, based on the image sequence, at least one motion flow with respect to an object in the vehicle surroundings; and
determining the ego-motion of the vehicle based on the at least one motion flow; and
calculating a time-to-collision from the at least one motion flow, the time-to-collision being factored into the determining of the ego-motion;
wherein the determining of the ego-motion of the vehicle includes drawing data from at least one vehicle sensor that measures at least one of an instantaneous speed and an instantaneous steering angle, and
wherein the determining of the ego-motion of the vehicle includes drawing data from at least one ultrasonic sensor of the vehicle that measures a distance from the object in the vehicle surroundings, and
wherein the ego-motion includes prompting counter-steering of the vehicle.

7. A driver assistance system for determining an ego-motion of a vehicle, comprising:
a vehicle camera for taking a sequence of images, successive in time, of vehicle surroundings;
a component, for determining, based on the image sequence, at least one motion flow with respect to an object in the vehicle surroundings; and
a component for determining the ego-motion of the vehicle based on the at least one motion flow; and
calculating a time-to-collision from the at least one motion flow, the time-to-collision being factored into the determining of the ego-motion;
wherein the determining of the ego-motion of the vehicle includes drawing data from at least one vehicle sensor that measures at least one of an instantaneous speed and an instantaneous steering angle,
wherein the determining of the ego-motion of the vehicle includes drawing data from at least one ultrasonic sensor of the vehicle that measures a distance from the object in the vehicle surroundings, and
wherein the ego-motion includes prompting counter-steering of the vehicle.

* * * * *